Patented May 22, 1934

1,960,186

UNITED STATES PATENT OFFICE 1,960,186

PROCESS FOR MANUFACTURING VAT DYE STUFFS

Giuseppe Matscher, Spinetta Marengo, Italy, assignor to Felice Bensa, Genoa, Italy No Drawing. Application June 25, 1930, Serial No. 463,833. In Austria July 16, 1929

2 Claims. (Cl. 204—9)

A number of processes is known for manufacturing vat dye stuffs from perylene diketones, which however are open to various objections. The subject matter of the present invention is a process for manufacturing such dye stuffs by means of electrolysis, electrolytically produced oxygen plays an essential part in the reaction. For this purpose the material to be treated is dissolved in suitable solvents or mixtures of such solvents; preferably concentrated sulphuric acid is used. An acid of about 66° Bé. has been found advantageous. The concentrated sulphuric acid is not only a solvent but produces also chemical actions, more particularly a dehydrating one. It has been found advantageous to maintain throughout the reaction an approximately constant concentration of the sulphuric acid and to replenish any consumed water if necessary. I wish it to be understood that my invention is not limited to the following examples of carrying the same into practice but the reaction may be altered in various ways. Further additions may be made to the solution such as condensing, dehydrating or catalyzing agents etc. or the solution may be diluted by other solvents for regulating the reaction or for controlling it as may be desired.

Example 1 part by weight of dibenzoyl perylene is dissolved in 50 parts by weight of concentrated sulphuric acid and is subjected to electrolysis in a suitable or usual apparatus, currents having 3.5 to 4 volts and 0.1 to 0.5 amperes per square decimetre being made use of. The solution at first blue becomes gradually green at the anode, the reaction is complete when a test precipitated with water gives bluish violet flakes dissolving in alkaline hydrosulphite solution with a blue colour. The reaction is completed in about 10 hours. Preferably the liquid is kept in continuous movement.

The dyeing stuff is separated by pouring the liquid into cold water, filtration with suction and drying. In the dry state the dye stuff forms a dark violet powder dissolving in concentrated sulphuric acid with a green colour in most organic solvents it dissolves difficultly, in nitrobenzene it dissolves with a reddish violet colour. The colour of the vat is blue with red fluorescence; cotton takes it up with a blue colour and turns violet on exposure to air.

The reaction takes a much longer time when working at low temperatures.

Of course the solvents used must be electrically conductive.

The oxidation primarily taking place is caused by persulphuric acid and monopersulphuric acid formed during the passage of the current, whilst in a successive phase the formation of a ring is caused by the water splitting off action of concentrated sulfuric acid. It is a well known fact that there is no analogy between electrolyzing watery solutions and solutions in concentrated sulphuric acid. It has been possible to isolate the products in the intermediate steps; the analysis of these intermediate products make it highly probable, that in a first phase OH groups are formed in—4.10—position of the perylene ring whilst in a second step water is split off; therefore the total reaction may be indicated as follows:

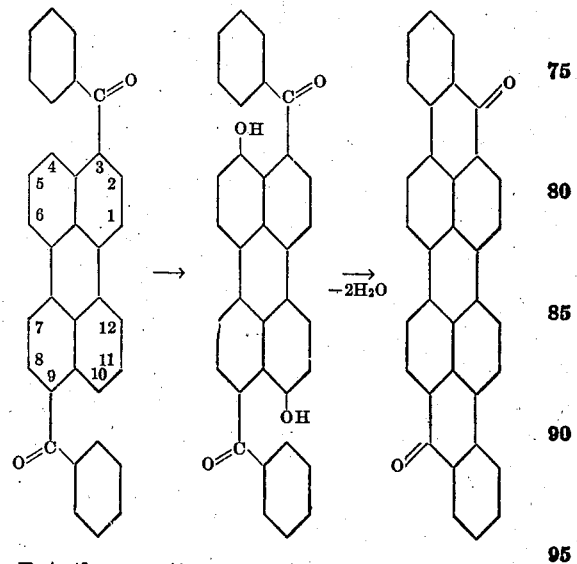

But the reaction does not come to an end thereafter, but advances insofar as at the same time also oxidations in the nucleus take place.

What I claim is:

1. A process for manufacturing vat dye stuffs from perylene diketones comprising the steps of dissolving the said perylene diketones in concentrated sulphuric acid and electrolyzing the solution so obtained.

2. A process for manufacturing vat dye stuffs from perylene diketones comprising the steps of dissolving the said perylene diketones in concentrated sulphuric acid of a concentration of about 66° Bé. and electrolyzing the solution so obtained and maintaining substantially constant the said concentration of the sulphuric acid during the entire reaction.

GIUSEPPE MATSCHER.